US012112152B1

(12) United States Patent
Kumar et al.

(10) Patent No.: US 12,112,152 B1
(45) Date of Patent: *Oct. 8, 2024

(54) GENERATING A PLATFORM-AGNOSTIC DATA PIPELINE VIA A LOW CODE TRANSFORMATION LAYER SYSTEMS AND METHODS

(71) Applicant: Citibank, N.A., New York, NY (US)

(72) Inventors: Vaibhav Kumar, Monroe, NJ (US); Ashutosh Pandey, Brandon, FL (US); Tanujit Ghosh, Mississauga (CA)

(73) Assignee: CITIBANK, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/497,854

(22) Filed: Oct. 30, 2023

Related U.S. Application Data

(63) Continuation of application No. 18/359,843, filed on Jul. 26, 2023, now Pat. No. 11,816,460, which is a continuation of application No. 18/124,543, filed on Mar. 21, 2023, now Pat. No. 11,733,984.

(51) Int. Cl.
*G06F 8/41* (2018.01)
*G06F 21/57* (2013.01)

(52) U.S. Cl.
CPC .......... *G06F 8/4452* (2013.01); *G06F 21/577* (2013.01)

(58) Field of Classification Search
None
See application file for complete search history.

(56) References Cited

U.S. PATENT DOCUMENTS

| | | | |
|---|---|---|---|
| 10,747,506 B2 * | 8/2020 | Seif .......................... | G06F 8/34 |
| 11,188,525 B2 | 11/2021 | Athavale et al. | |
| 11,226,813 B2 | 1/2022 | Gungabeesoon et al. | |
| 11,614,923 B2 | 3/2023 | Burnett et al. | |
| 11,733,984 B1 * | 8/2023 | Kumar .................. | G06F 21/577 |
| | | | 717/140 |

(Continued)

OTHER PUBLICATIONS

U.S. Appl. No. 18/535,001, filed Dec. 11, 2023, titled "Systems and Methods for Updating Rule Engines During Software Development Using Generated Proxy Models With Predefined Model Deployment Criteria".

*Primary Examiner* — Marina Lee
(74) *Attorney, Agent, or Firm* — Perkins Coie LLP

(57) ABSTRACT

Systems and methods for generating a platform-agnostic data pipeline via a low code transformation layer are disclosed. The system receives one or more user selections of (i) nodes and (ii) links linking the nodes, indicating a data pipeline architecture of transfer/management/flow of data via a GUI. In response to receiving a user selection to implement the data pipeline, the system automatically identifies/generates a set of code portions, based on one or more software objects (e.g., JSON objects) associated with the user selections indicating the data pipeline architecture. The system then identifies a platform identifier associated with a remote server and generates a set of executable instructions (e.g., a script, executable program, or other file) associated with the data pipeline architecture by using a transformation component. The system then provides the executable instructions to the remote server to host the data pipeline.

20 Claims, 5 Drawing Sheets

(56) References Cited

U.S. PATENT DOCUMENTS

| | | | |
|---|---|---|---|
| 11,734,027 B2 * | 8/2023 | Katahanas | G06F 16/93 |
| | | | 715/753 |
| 11,816,460 B1 * | 11/2023 | Kumar | G06F 8/4452 |
| 11,983,636 B2 * | 5/2024 | Kujawinski | G06N 20/00 |
| 2018/0052861 A1 | 2/2018 | Seetharaman et al. | |
| 2018/0342324 A1 | 11/2018 | Cha et al. | |
| 2019/0384461 A1 | 12/2019 | Seif et al. | |
| 2020/0242487 A1 | 7/2020 | Jain et al. | |
| 2021/0034581 A1 | 2/2021 | Boven et al. | |
| 2021/0064742 A1 | 3/2021 | Panigrahi | |
| 2021/0304021 A1 | 9/2021 | Puri et al. | |
| 2022/0121981 A1 | 4/2022 | Chaudhuri et al. | |
| 2022/0245115 A1 | 8/2022 | Kulkarni et al. | |
| 2022/0398186 A1 | 12/2022 | Mudumba | |

\* cited by examiner

GENERATING A PLATFORM-AGNOSTIC DATA PIPELINE VIA A LOW CODE TRANSFORMATION LAYER SYSTEMS AND METHODS

CROSS-REFERENCE TO RELATED APPLICATION(S)

This application is a continuation of U.S. patent application Ser. No. 18/359,843 entitled "GENERATING A PLATFORM-AGNOSTIC DATA PIPELINE VIA A LOW CODE TRANSFORMATION LAYER SYSTEMS AND METHODS" filed Jul. 26, 2023, now U.S. Pat. No. 11,816,460, which is a continuation of U.S. patent application Ser. No. 18/124,543 entitled "GENERATING A PLATFORM-AGNOSTIC DATA PIPELINE VIA A LOW CODE TRANSFORMATION LAYER SYSTEMS AND METHODS" filed Mar. 21, 2023, now U.S. Pat. No. 11,733,984. The content of the foregoing applications is incorporated herein by reference in its entirety.

BACKGROUND

Creating robust and useful data pipelines is often a task spearheaded by computer scientists and data analysts due to the sheer complexity and knowledge required to create data pipelines. For instance, a data pipeline may represent a chain of data processing elements that can transform and move raw data from one or more sources to a destination. For example, when creating a data pipeline, a user must understand the intricacies involved with the type of data, how to filter the data, how to combine data of differing sources, and ultimately how to export the data in an easily understood format. Moreover, creating a data pipeline takes an exorbitant amount of time which may lead to useful data currently being provided by data sources to be missed or unconsidered when creating the data pipeline. Furthermore, end-users (e.g., business professionals or other non-specialized/non-technical users) have no knowledge/mechanism for creating data pipelines due to the complexity involved with creating data pipelines. Such users may understand the need for a given data set but are otherwise unable to obtain the desired data in a usable format due to lack of knowledge of how to create or set up a data pipeline required for obtaining the data set. Moreover, data pipelines may be configured for a given platform only (e.g., computing system, operating system, processor, etc.) and may not be scalable to other platforms, further increasing the difficulty when creating/using a data pipeline.

Figure 1:
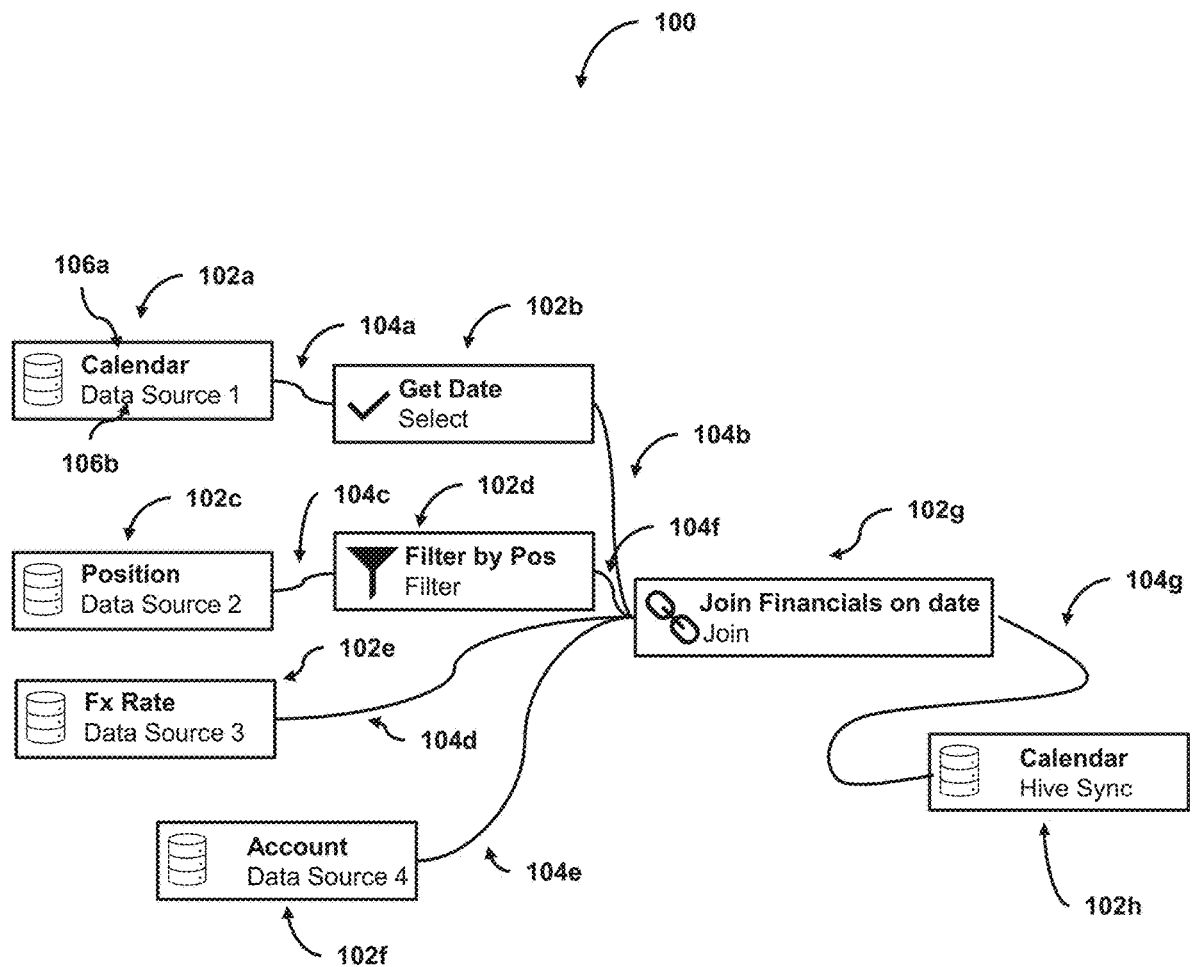
FIG. 1 is an illustrative platform-agnostic data pipeline via a low code transformation layer, in accordance with some implementations of the present technology.

In the drawings, some components and/or operations can be separated into different blocks or combined into a single block for discussion of some of the implementations of the present technology. Moreover, while the technology is amenable to various modifications and alternative forms, specific implementations have been shown by way of example in the drawings and are described in detail below. The intention, however, is not to limit the technology to the specific implementations described. On the contrary, the technology is intended to cover all modifications, equivalents, and alternatives falling within the scope of the technology as defined by the appended claims.

DETAILED DESCRIPTION

Given the complexity and specialized knowledge required for creating robust data pipelines, end-users are at a loss when attempting to obtain the necessary data required to analyze a given trend. For instance, business professionals are not trained nor do they possess the specialized knowledge to create a data pipeline from scratch, although the business professionals may know exactly the type of data they need to analyze. Existing solutions currently require that a business professional (e.g., an analyst) speak to a translator who may develop a strategic plan on which data sources are to be used and how one may alter the data (e.g., by filtering, combining, syncing, fitting, or otherwise operate on the data) to provide an easily understood format of the data to be used for analysis purposes. However, this still does not solve the problem of creating the data pipeline as the translator must communicate the plan with a computer/data engineer to physically create, design, and interconnect the computing architectures required to deliver the data in the requested format. This may lead to an increased amount of wasted time, money, and disconnect as the amount of people required to implement the data pipeline is increased. In addition, the resulting data pipeline may not adequately conform to the original requirements outlined by the business professional, leading to additional effort and resource usage to correct the issues.

Another common issue faced when creating data pipelines is determining which platform is best suited for the data pipeline. For instance, as conventional software applications (e.g., a data pipeline, legacy software, etc.) may be specific to a particular platform due to the compilers used to compile the source code associated with the data pipeline, the computer/data engineers must carefully select which computing language to write the source code in and which platform the pipeline will execute on. This leads to scalability issues as one pipeline may not execute properly (if at all) on a different platform as the new processor may be of a different architecture (e.g., instruction set) that is incompatible with a generated executable file of the original pipeline. Although computer engineers may recompile the source code on a different compiler, such executable files are not easily shared. For example, when a large amount of users are using the pipeline on a given platform, when the platform changes, the computer engineers must recompile the original source code, distribute the generated executable file associated with the recompiled source code (e.g., over the Internet or other computing networks), and finally reinstall the updated executable file. This leads to an increased amount of wasted computer processing resources, computer memory resources, and an increased amount of network traffic that otherwise may be used for other functions/operations.

Existing systems currently are designed for computer savvy computer/data engineers (e.g., users trained/skilled at generating software code) to create data pipelines that are specific to a given platform. However, without a mechanism to enable non-computer savvy users to create data pipelines, such users are at a loss for creating or implementing valuable data pipelines to obtain and analyze crucial data. Moreover, as the computer engineers may not fully understand one or more requirements an analyst needs to analyze the data appropriately, creating the data pipeline may be prone to numerous errors causing the computer engineers to go back, edit, and modify the data pipeline to fit the analysts' needs—thereby increasing the time at which these data pipelines are created while wasting valuable computing processing and memory resources at the same time. Lastly, as these existing systems create data pipelines custom tailored to a specific platform, users of other platforms cannot access the data pipeline or receive updates without waiting for a newly created executable file of the data pipeline to be implemented, further causing user frustration and increasing the amount of network traffic when updates or the executable file is shared.

Thus, in light of these and other problems with conventional solutions and systems, there is a need for providing a simplified user interface that can enable users, such as business professionals, to create data pipelines without needing specialized training to create the necessary data pipeline. There is further a need to enable quick generation of these data pipelines to reduce the amount of time spent creating, adjusting, and modifying a data pipeline. Moreover, there is a need to create platform-agnostic data pipelines to enable data pipelines to be implemented on a variety of differing platforms, to provide updates to such data pipelines in a scalable and efficient manner, and to quickly share an implemented pipeline amongst users of different platforms.

The inventors have developed a system for generating a platform-agnostic data pipeline via a low code transformation layer. For instance, the inventors have developed a low code transformation layer that uses one or more of an improved graphical user interface (GUI), a template, and predetermined code portions to generate a platform-agnostic data pipeline. End-users, such as business professionals, can use the GUI to easily select one or more nodes representing data pipelines operations and connect the nodes via one or more links. Using the nodes and the links, the system may generate a template in a first computing language in which the low code transformation layer may determine predetermined code portions that correspond to the one or more nodes and links to generate executable instructions in a second computing language corresponding to a remote execution platform (e.g., to which the data pipeline is to be executed, hosted, or ran on). By using the improved user interface, users without specialized knowledge on how to implement a data pipeline are enabled to quickly create and develop their own data pipelines that are customizable and tailored to their needs. Furthermore, by using the low code transformation layer, the created data pipeline may be platform-agnostic, meaning, that the data pipeline can be executed on any given platform irrespective of specific computing hardware (e.g., processors) or other computing-platform-related infrastructure. By doing so, the system may reduce the amount of computer processing and memory resources conventionally required to create, share, and provide updates to the data pipeline.

In various implementations, the methods and systems described herein can generate a platform-agnostic data pipeline via a low code transformation layer. For example, the system receives user selection of (i) nodes and (ii) a set of links linking the nodes via a graphical user interface (GUI). The user selections can indicate an architecture of a data pipeline. The system can generate, using the user selections, a JSON object (e.g., or other software object/file) associated with the user selections indicating the data pipeline architecture. In response to receiving a user selection to implement the data pipeline (e.g., to be hosted on a remote execution platform), the system can determine, using the JSON object, a set of code portions. Each code portion of the set of code portions can correspond to a respective combination of at least (i) a first and a second node of the user selections and (ii) a link linking the first and second nodes. The system generates executable instructions (or other computer readable instructions) associated with the data pipeline architecture by using a transformation component configured to process the set of code portions with respect to the remote execution platform using the JSON object. The system then provides the executable instructions to the remote execution platform to host the data pipeline.

In the following description, for the purposes of explanation, numerous specific details are set forth in order to provide a thorough understanding of implantations of the present technology. It will be apparent, however, to one skilled in the art that implementation of the present technology can be practiced without some of these specific details.

The phrases "in some implementations," "in several implementations," "according to some implementations," "in the implementations shown," "in other implementations," and the like generally mean the specific feature, structure, or characteristic following the phrase is included in at least one implementation of the present technology and can be included in more than one implementation. In addition, such phrases do not necessarily refer to the same implementations or different implementations.

System Overview

FIG. 1 shows an illustrative platform-agnostic data pipeline via a low code transformation layer, in accordance with some implementations of the present technology. For example, a user (e.g., an analyst, a computer engineer, a data engineer, a corporate executive, or other user) can create a platform-agnostic data pipeline 100. For example, the platform-agnostic data pipeline may include nodes 102*a*-102*h* (or as collectively referred to as nodes 102) and links 104*a*-104*g* (or as collectively referred to links 104). Each node 102 can be associated with a data source or an operation. As an example, a data source can be any database, table, data structure, or other data source configured to store data. As another example, an operation can be any operation that performs an action (e.g., on data, associated with data, or with respect to data). For instance, an operation may be a filter operation, a transform operation, a join operation, a select operation, a remove operation, a group operation, a load to database operation, drop column operation, drop row operation, add column operation, add row operation, sort operation, format operation, or other operation that may be performed on or performed with data.

Each node or operation can include or be provided with one or more user selectable commands or user provided instructions. For example, a filter operation may filter data by a position or other criteria (e.g., as inputted by the user). In some implementations, the user selectable commands or user provided instructions may be default commands or instructions (e.g., not requiring a user to select or provide instructions). For example, a join operation may be associated with default commands to append rows from one data source to another data source. Alternatively, the join operation may be associated with user selectable commands (e.g., indicating to join only certain rows/columns of one data source with certain rows/columns of another data source). Such user provided commands/instructions may be provided by the user (e.g., selecting one or more commands/instructions from a list, drop down menu, or other interface, providing one or more commands/instructions by typing in the commands/instructions, performing one or more gestures, or otherwise providing the commands/instructions). In some implementations, the commands or instructions may further indicate a set of criteria, as will be described below.

A filter operation can filter data according to a date, time, position, value, a format, a length, a size, or other value associated with the data. A transform operation can transform data into a given format, metric, size, measurement, currency, range, or other transformation criteria associated with the data. A join operation can join data of a set of data sources together, such as joining rows/columns of a data source(s), appending data to a data structure, or other joining operation with respect to a set of data sources. A select operation can select, obtain, get, or retrieve data with respect to a given criteria (e.g., select data based on a date, select data based on a format, select data based on a type, etc.). A remove operation may remove data from a given data source/data structure, such as removing rows/columns, removing values, removing headers, removing nodes of a tree data structure, removing links of a tree data structure, or other data removing operation. A group operation may group data together, such as grouping data based on a type, size, range, date, time, value, or other data grouping criteria. A load to database operation may upload data to a given data source, database, data structure, update a database/data structure, or other database loading operation. A drop column operation may remove, hide, or delete a given column (e.g., in a table data structure). A drop row operation may remove, hide, or delete a given row (e.g., in a table data structure). An add column operation may add, append, update, or join a column (e.g., in a table data structure). An add row operation may add, append, update, or join a row (e.g., in a table data structure). A sort operation may sort information based on a time, date, value, size, metric, or other data sorting criteria. A format operation may format data of a data source/data structure such as formatting data to a particular size, value, length, date, time, or other data formatting criteria. A conversion operation may convert data from one format to another format, such as converting data from one currency to another currency, one converting data from one metric to another metric, or other conversion criteria.

As shown in FIG. 1, each node can be labeled with a set of labels. For example, first node 102a may include first label 106a and second label 106b. Each label can indicate a reference value and a type value. For example, first label 106a indicates a reference value of "Calendar" indicating that the data source is a calendar data source, and second label 106b indicates a type value indicating that the node is associated with a "Data Source" (or data base type). In this way, when creating a data pipeline, users are provided with clear labels indicating an identifier associated with the node (e.g., a label associated with a given operation or data source to which data is modified, changed, altered, or obtained from) and a type identifier indicating what type of node is selected (e.g., a data source node, an operation node, or other node), thereby improving the user experience via an improved user interface.

The platform-agnostic data pipeline 100 can also include links 104. For example, the links may link together a set of nodes. For instance, first link 104a links first node 102a and second node 102b. In some implementations, each link 104 may be a directional link (e.g., indicating a data flow between one or more nodes). In other implementations, each link 104 may be a bi-directional link (e.g., indicating that data may flow back and forth between each node). In yet other implementations, the platform-agnostic data pipeline 100 may include a mixture of both directional and bi-directional links, in accordance with some implementations of the present technology.

Linking a set of nodes together may be associated with "connecting" or "supplementing" data associated with one node to data associated with another node (or an operation to another operation, or other combination). For example, to provide users with an easy-to-use user interface when creating data pipelines, as opposed to existing systems that require computer engineers and data engineers to manually code each interaction between a data source and an operation, users may quickly and easily link nodes together to forego the complex knowledge and specialized skills required to write code to implement a data pipeline architecture.

Links 104 can represent a path connecting two nodes together. For instance, as nodes may be associated with a data source, an operation, or an output (e.g., a visualization of data, a data structure, formatted data, etc.), when a node is linked to another node, data may be passed between the node(s). As an example, first node 102a may be linked via first link 104a to second node 102b. Where first node 102a represents a data source (e.g., a database) and second node 102b represents an operation node (e.g., select operation). As first node 102a and second node 102b are linked together, and second node 102b is an operation node (e.g., select operation node), second node 102b may retrieve data that may be associated with first node 102a. That is, in this example, first node 102a may be associated with a data source including dates and second node 102b may be configured to retrieve the dates associated with first node 102a via first link 104a. It should be noted that other combinations of nodes linked together may exist, in accordance with some implementations of the present technology. As such, links 104 may operationally connect nodes together to quickly and easily generate a flow of data between one or more nodes. In this way, the system may generate data pipelines without requiring users to be proficient in data pipeline architecture creation, thereby improving the user experience.

Suitable Computing Environments

Figure 2:
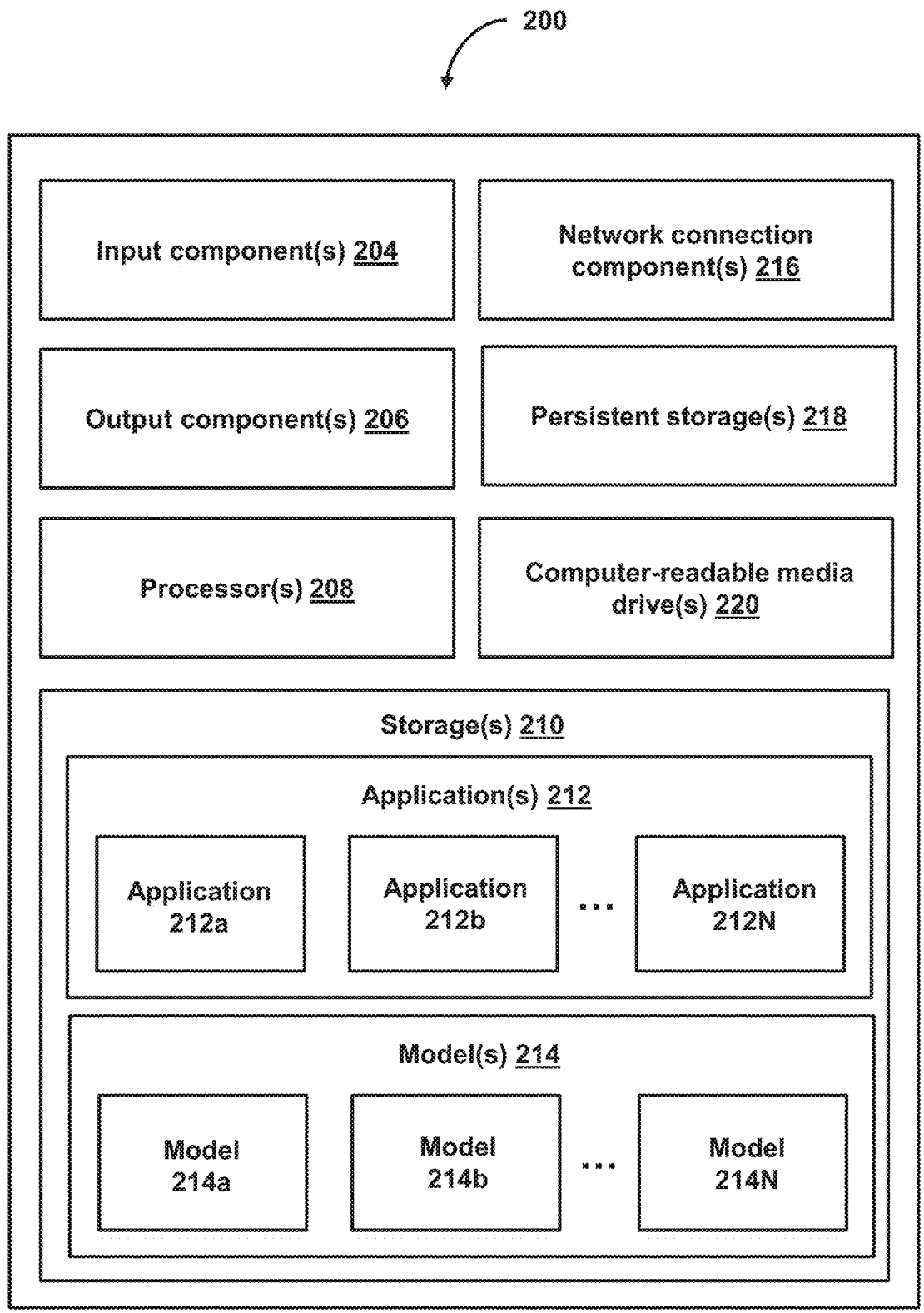
FIG. 2 is a block diagram showing some of the components typically incorporated in at least some of the computer systems and other devices on which the disclosed system operates in accordance with some implementations of the present technology.

FIG. 2 is a block diagram showing some of the components typically incorporated in at least some of the computer systems and other devices on which the disclosed system operates. In various implementations, these computer systems and other device(s) 200 can include server computer systems, desktop computer systems, laptop computer systems, netbooks, mobile phones, personal digital assistants, televisions, cameras, automobile computers, electronic media players, web services, mobile devices, watches, wearables, glasses, smartphones, tablets, smart displays, virtual reality devices, augmented reality devices, etc. In various implementations, the computer systems and devices include zero or more of each of the following: input components 204, including keyboards, microphones, image sensors, touch screens, buttons, track pads, mice, CD drives, DVD drives, 3.5 mm input jack, HDMI input connections, VGA input connections, USB input connections, or other computing input components; output components 206, including display screens (e.g., LCD, OLED, CRT, etc.), speakers, 3.5 mm output jack, lights, LED's, haptic motors, or other output-related components; processor(s) 208, including a central processing unit (CPU) for executing computer programs, a graphical processing unit (GPU) for executing computer graphic programs and handling computing graphical elements; storage(s) 210, including at least one computer memory for storing programs (e.g., application(s) 212, model(s) 214, and other programs) and data while they are being used, including the facility and associated data, an operating system including a kernel, and device drivers; a network connection component(s) 216 for the computer system to communicate with other computer systems and to send and/or receive data, such as via the Internet or another network and its networking hardware, such as switches, routers, repeaters, electrical cables and optical fibers, light emitters and receivers, radio transmitters and receivers, and the like; a persistent storage(s) device 218, such as a hard drive or flash drive for persistently storing programs and data; and computer-readable media drives 220 (e.g., at least one non-transitory computer-readable medium) that are tangible storage means that do not include a transitory, propagating signal, such as a floppy, CD-ROM, or DVD drive, for reading programs and data stored on a computer-readable medium. While computer systems configured as described above are typically used to support the operation of the facility, those skilled in the art will appreciate that the facility may be implemented using devices of various types and configurations, and having various components.

Figure 3:
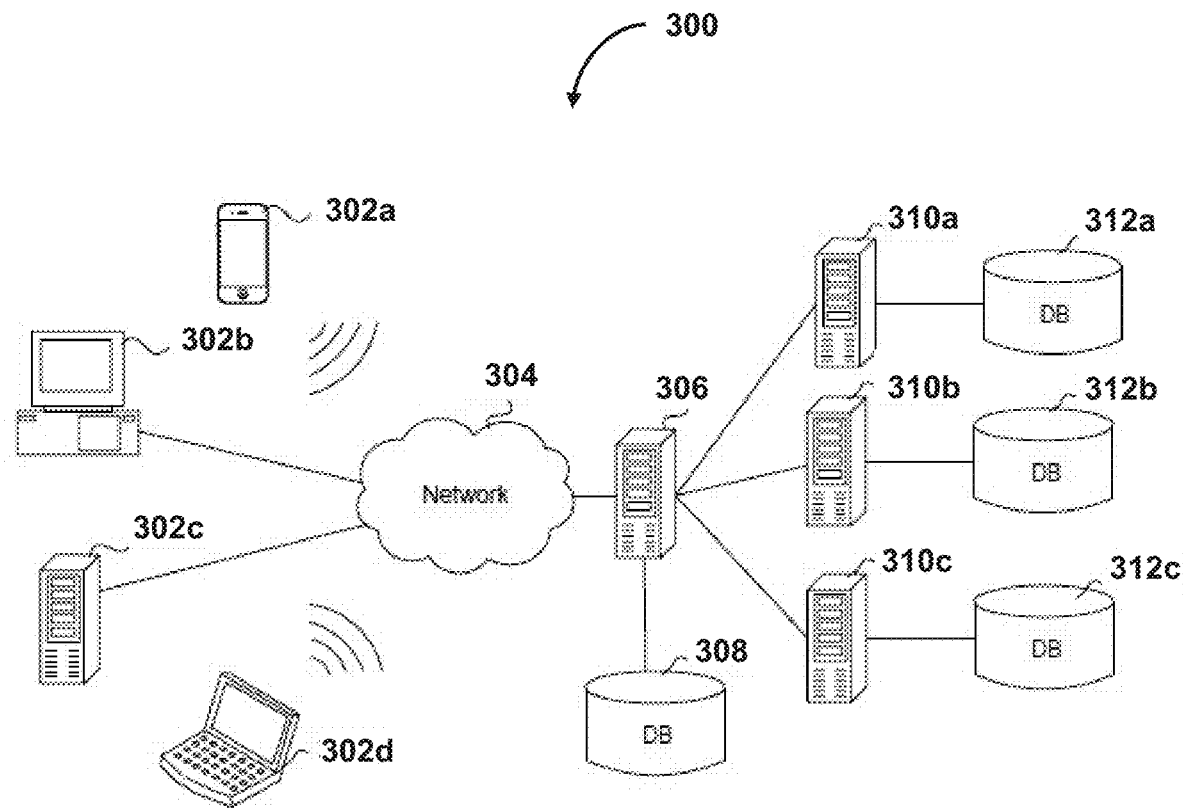
FIG. 3 is a system diagram illustrating an example of a computing environment in which the disclosed system operates in some implementations of the present technology.

FIG. 3 is a system diagram illustrating an example of a computing environment in which the disclosed system operates in some implementations. In some implementations, environment 300 includes one or more client computing devices 302*a*-*d*, examples of which can host the platform-agnostic data pipeline 100 (or other system components). For example, the computing devices 302*a*-*d* can comprise distributed entities a-d, respectively. Client computing devices 302 operate in a networked environment using logical connections through network 304 to one or more remote computers, such as a server computing device. In some implementations, client computing devices 302 may correspond to device 200 (FIG. 2).

In some implementations, server computing device 306 is an edge server which receives client requests and coordinates fulfillment of those requests through other servers, such as servers 310*a*-*c*. In some implementations, server computing devices 306 and 310 comprise computing systems. Though each server computing device 306 and 310 is displayed logically as a single server, server computing devices can each be a distributed computing environment encompassing multiple computing devices located at the same or at geographically disparate physical locations. In some implementations, each server computing device 310 corresponds to a group of servers.

Client computing devices 302 and server computing devices 306 and 310 can each act as a server or client to other server or client devices. In some implementations, server computing devices (306, 310*a*-*c*) connect to a corresponding database (308, 312*a*-*c*). As discussed above, each server computing device 310 can correspond to a group of servers, and each of these servers can share a database or can have its own database. Databases 308 and 312 warehouse (e.g., store) information such as, predefined ranges, predefined thresholds, error thresholds, graphical representations, code portions (e.g., predetermined code portions, predetermined code portions corresponding to combinations of nodes and links, policy-controlled code portions), system policies or other policies, templates, JSON templates, JSON objects, computing languages, platform identifiers, data structures, software application identifiers, nodes, links, graphical representations of nodes and links, predetermined data pipeline architectures, default data pipeline architectures, pre-generated data pipelines, data pipelines, transformation components, visual layouts, security-assessment values, computing language identifiers, mathematical formulas (e.g., weighted average, weighted sum, or other mathematical formulas), graphical elements (e.g., colors, shapes, text, images, multimedia), system protection mechanisms, or other information.

Though databases 308 and 312 are displayed logically as single units, databases 308 and 312 can each be a distributed computing environment encompassing multiple computing devices, can be located within their corresponding server, or can be located at the same or at geographically disparate physical locations.

Network 304 can be a local area network (LAN) or a wide area network (WAN) but can also be other wired or wireless networks. In some implementations, network 304 is the Internet or some other public or private network. Client computing devices 302 are connected to network 304 through a network interface, such as by wired or wireless communication. While the connections between server computing device 306 and server computing device 310 are shown as separate connections, these connections can be any kind of local, wide area, wired, or wireless network, including network 304 or a separate public or private network.

Generating Platform-Agnostic Data Pipelines

Figure 4:
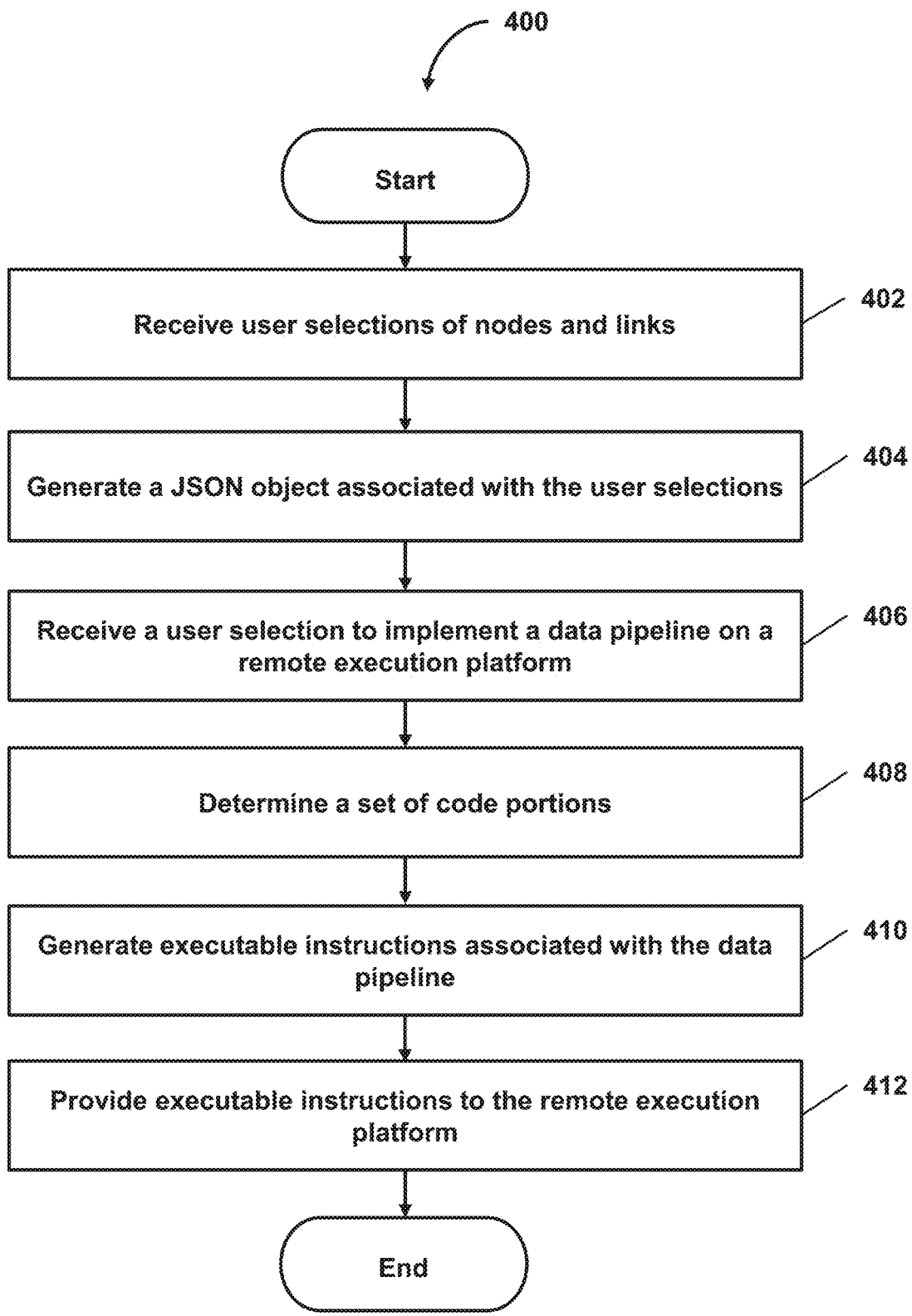
FIG. 4 is a flow diagram illustrating a process of generating a platform-agnostic data pipeline via a low code transformation layer, in accordance with some implementations of the present technology.

FIG. 4 a flow diagram illustrating a process of generating a platform-agnostic data pipeline via a low code transformation layer, in accordance with some implementations of the present technology.

At act 402, process 400 can receive user selections of nodes and links. For example, process 400 can receive, via a graphical user interface (GUI), user selections of (i) nodes and (ii) a set of links linking the nodes. For example, the user selections may indicate a data pipeline architecture of a data pipeline. To enable unskilled or otherwise untrained users to create data pipelines, a user may interact with a GUI to enable the user to select nodes, link nodes together, provide commands, instructions, or other criteria to generate a data pipeline without the need to possess the complex knowledge associated with coding a data pipeline from scratch via source code.

Figure 5:
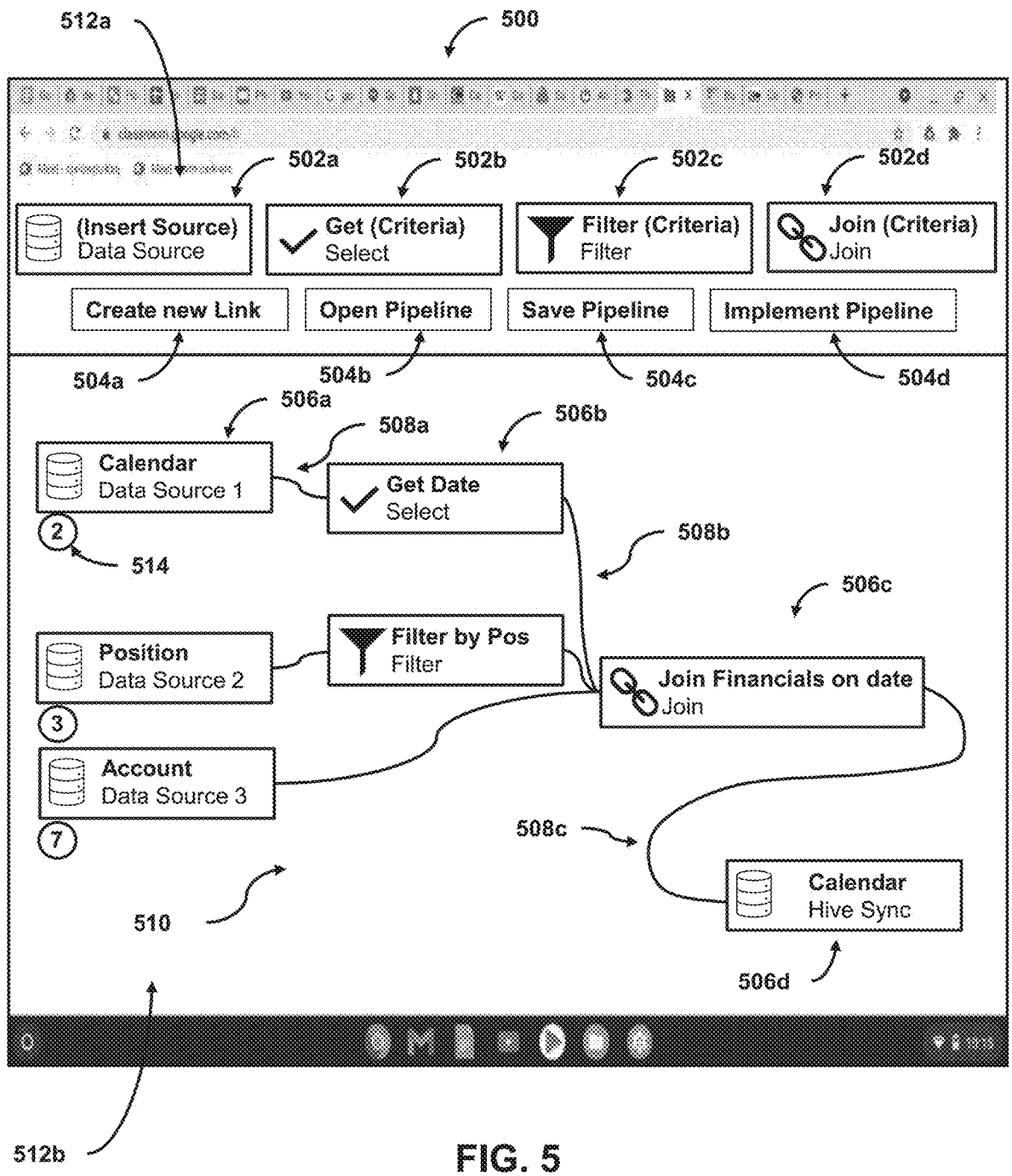
FIG. 5 shows an illustrative representation of a Graphical User Interface (GUI) for generating a platform-agnostic data pipeline via a low code transformation layer, in accordance with some implementations of the present technology.

Referring to FIG. 5, FIG. 5 shows an illustrative representation of a Graphical User Interface (GUI) for generating a platform-agnostic data pipeline via a low code transformation layer, in accordance with some implementations of the present technology. For example, GUI 500 can be provided via a website associated with a data pipeline service provider. The data pipeline service provider may enable users to create data pipelines via the GUI and in some implementations, when implemented, may generate executable instructions to host the data pipeline on one or more computing devices (e.g., a user device, a server, cloud-based computing network, or other computing device).

To enable users to create data pipelines, a user can interact with GUI 500. GUI 500 can include one or more user selectable components, such as node buttons 502*a*-502*d* (or as collectively referred to as node button(s) 502), command buttons 504*a*-504*b* (or as collectively referred to as command buttons 504), or other user selectable components. For example, in a first portion 512a of GUI 500, first portion 512a can display the user selectable components, and second portion 512b of GUI 500 can enable users to create a data pipeline architecture 510. For instance, first node button 502a may indicate a data source node (e.g., a data repository), second node button 502b may indicate a get operation node, third node button 502c may indicate a filter operation node, fourth node button 502d may indicate a join operation node. First command button 504a may indicate a new link button, second command button 504b may indicate a command to enable a user to open a pre-existing pipeline, third command button 504c may indicate a save pipeline button (e.g., to save the current data pipeline architecture 510 in second portion 512b of GUI 500), and fourth command button 504d may indicate an implement pipeline button (e.g., to run, host, or generate executable instructions to create the data pipeline architecture 510). It should be noted that the user selectable components shown in FIG. 5. are exemplarily and that other user selectable components (e.g., nodes, command buttons, etc.) may exist, in accordance with one or more implementations of the present technology.

In some implementations, a user may select the user selectable components to create (or otherwise generate a data pipeline). For example, a user may select user selectable components in a "drag-and-drop" fashion to create a data pipeline architecture. As another example, a user may select user selectable components and the selected user selectable component may be populated into the data pipeline architecture in one or more default positions (e.g., to enable the user to forgo dragging-and-dropping a user selectable component). By creating data pipelines via a GUI, the system generates for display, in a visual layout, the data pipeline architecture 510 of the created data pipeline to enable users to view the architecture of a data pipeline which reduces errors involved with creating data pipelines otherwise missed by conventionally coding data pipelines using source code. In this way, the system provides an easily understood GUI to enable unskilled users to create data pipeline architectures, thereby improving the user experience. Additionally, in this way, the system provides a GUI to enable users to edit or alter a data pipeline architecture without needing to compile or recompile each variation of the data pipeline, thereby reducing the amount of computer processing and computer memory resources otherwise required to edit a data pipeline.

In one use case, a user can create a data pipeline architecture 510 using user selectable components. The user may select one or more of node buttons 502 from first portion 512a of the GUI 500 and drag them into a position in a second portion 512b of the GUI 500. For instance, the user can select node button 502a and drag an instance of the node button 502a into the second portion 512b of the GUI 500 to place first node 506a. The user may then provide first node 506a with a label (e.g., Calendar) to indicate a data source (or database/data repository) from which data will be retrieved from. Similarly, the user can select node button 502b to drag an instance of the node button 502b into the second portion 512b of the GUI 500 to place second node 506b. The user may also provide second node 506b with an instruction (e.g., get date) to retrieve one or more dates from a given node. The user can also select command button 504a to create a new link. For example, the user may select command button 504a which may enable the user to draw, drag, drop, or otherwise create links 508. In this example, the user may draw a link connecting first node 506a and second node 506b together via first link 508a. As such, the user may repeat such actions to create a data pipeline architecture 510. For instance, the user may connect the nodes 506 via links 508 (e.g., including fourth node 506d, such as output node) to create the data pipeline architecture 510. In this way, the system enables unskilled users to efficiently and effectively create data pipelines through a GUI as opposed to writing source code, compiling, and testing the data pipeline, thereby improving the user experience.

In some implementations, a user selected node can include an instruction to generate a data structure. For example, to enable a user to analyze results associated with a data pipeline (e.g., retrieved data), the retrieved data may be stored in a data structure to be accessible to the user. As such, a user may select a node button that may be associated with an instruction/command to generate a data structure. For instance, upon selecting a node button, such as first node button 502a, and placing the selected node into position (e.g., fourth node 506d, such as a data output node), the user may provide fourth node 506d with an instruction/command to generate a data structure to store the retrieved data from the data pipeline architecture 510. In some implementations, the data structure can be a default data structure (e.g., a table, a tree, an array, etc.) or the data structure may be indicated (e.g., provided) by the user to enable the user to indicate which type of data structure (or format) they wish to output the data from the data pipeline architecture 510. Additionally, in some implementations, the user may further provide an instruction/command indicating a particular database to store the data retrieved by the data pipeline architecture 510. In this way, the system provides an easy-to-use user interface to enable users of varying knowledge backgrounds to create robust data pipelines, thereby improving the user experience.

At act 404, process 400 can generate a JSON object associated with the user selections. For example, process 400 can generate, using the user selections, a JSON object associated with the user selections indicating the data pipeline architecture. JSON (e.g., JavaScript Object Notation) is a format for storing and transporting data. The advantage of using JavaScript and generating a JSON object indicating the data pipeline architecture is to enable user-created data pipelines to be generated for any platform, regardless of the computing requirements of the given platform (e.g., the processors, instruction sets, hardware, software, etc.). For instance, a JSON object may be generated (e.g., via a website, webpage, web browser, or graphical user interface) to indicate the data pipeline architecture created by a user. As an example, the JSON object may indicate a template of the user selections (e.g., the nodes, the links linking the nodes, the user provided instructions/commands associated with the nodes, etc.) to enable a platform agnostic data pipeline to be generated.

As an example, upon creating a data pipeline via GUI 500 (FIG. 5), a user may select a command button 504 (e.g., third command button 504c) to save the data pipeline. Upon saving the data pipeline, process 400 may generate a JSON object of the data pipeline architecture 510 indicating a template of data pipeline architecture 510. For instance, the JSON object may include one or more key value pairs indicating nodes, instructions associated with the nodes, labels associated with the nodes, commands associated with the nodes, or other information of the data pipeline architecture. Additionally, the JSON object may further include information regarding the links of the data pipeline architecture 510, to indicate what nodes are connected together. As a JSON object uses a small amount of memory (e.g., 1 kb, 2 kb, 3 kb, etc.), the system reduces the amount of computing memory required to save/store data pipeline architectures as opposed to existing systems that require large source code files to implement/create data pipelines. Additionally, by using JSON objects indicating data pipeline architectures, data pipelines may be shared amongst users quickly and efficiently over wired/wireless computing networks (e.g., the Internet), thereby reducing the amount of network traffic and network bandwidth traditionally utilized to share fully implemented data pipelines.

At act 406, process 400 can receive a user selection to implement a data pipeline on a remote execution platform. For example, process 400 can receive a user selection to implement the data pipeline, where the data pipeline is to be hosted on a remote execution platform. For instance, a user may select a command button 504 (e.g., fourth command button 504*d*) to implement the data pipeline. The data pipeline may be implemented on a remote execution platform, such as a remote computing platform (e.g., remote server, remote computer, remote network, remote cloud computing system, etc.). For example, to reduce the amount of computer processing resources conventionally required to implement a data pipeline, a user can implement a data pipeline to be hosted on a remote server. The remote server may be part of a data pipeline service provider's computing network that may be configured to host data pipelines. Additionally, as a user may be creating a data pipeline architecture on a mobile device (e.g., smartphone), via a GUI (e.g., GUI 500), the user may indicate a remote execution platform to host (or otherwise implement/run) the data pipeline to reduce the amount of computational resources used at the mobile device. For instance, as a mobile device may not be configured with a robust processor or large memory, the user may implement the data pipeline on a remote execution platform. In some implementations, however, the data pipeline may be implemented on a non-remote execution platform (e.g., implemented locally on a device the user is currently using). For example, where the user is using a desktop computer, the data pipeline may be implemented on the desktop computer. In this way, the system enables various platforms to implement or host the data pipeline (e.g., where computer processor and memory resources may be sufficient or lacking), to allow a multitude of options to host the data pipeline, irrespective of computational requirements of a device the user is using the create the data pipeline architecture.

At act 408, process 400 can determine a set of code portions. For example, in response to receiving the user selection to implement the data pipeline, process 400 can determine, using the JSON object, a set of code portions. Each code portion of the set of code portions can correspond to a respective combination of at least (i) a first and a second node of the user selections and (ii) a link linking the first and second nodes. For instance, process 400 may detect a user selection to implement the data pipeline, and may cause, during a runtime routine, the identification of a platform identifier associated with the remote execution platform, the determination of the set of code portions (e.g., predetermined policy-controlled code portions), and the generation of executable instructions to implement the data pipeline. For example, by performing such steps during a runtime routine, the system may reduce the amount of computing processing and memory resources conventionally required to generate a data pipeline as runtime routines are performed at runtime (e.g., and do not require specialized compilers for a given computing language). That is, runtime routines do not rely on a compiler and may be generated quickly and efficiently as opposed to conventional computer programs requiring source code to be compiled and then executed on a specific platform, affecting the scalability and shareability of data pipelines (or other computer programs).

To generate a platform-agnostic data pipeline (e.g., to be hosted on a given platform), process 400 can identify which execution platform the data pipeline is to be hosted on. For instance, as each execution platform (e.g., computing device, computing system, server, servers, etc.) may each be associated with their own computational requirements (e.g., processors, software, hardware, memory requirements, security requirements, etc.), process 400 may identify which execution platform the data pipeline is to be executed on. By doing so, process 400 may determine the correct set of code portions to use when generating executable instructions for implementing the data pipeline.

As discussed above, the code portions can be predetermined policy-controlled code portions. For example, a service provider may use a policy for controlling which data repositories, sources, and actions (e.g., operations such as filtering, selecting, joining, etc.) on the data may be implemented. The policy may indicate security requirements or permissions that are associated with implementing the data pipeline. For example, as data pipelines can be used to obtain sensitive user data, the policy may provide requirements and other rules pertaining to use of the user data. As such, each code portion may be a pre-vetted code portion that conforms to one or more regulations, rules, or other policies as defined by the service provider and/or industry. Moreover, each code portion may be associated with a security assessment value indicating a level of security associated with the remote execution platform. For example, as described above, not only may the policy indicate security requirements associated with implementing the data pipeline, but the platform at which the data pipeline is to be executed on may also have its own security vulnerabilities. As such, when implementing a data pipeline, it is advantageous to be aware of how a code portion (e.g., the source code) for implementing a data pipeline may interact with a given platform. As such, each code portion may be associated with a predetermined security assessment value (e.g., score, value, quantitative value, qualitative value) indicating how secure the given code portion is with respect to a given execution platform. In some implementations, process 400 may generate for display the security assessment value via the GUI to notify the user of how secure the data pipeline to be implemented on the execution platform is. In this way, the user may be provided with security information to aid their decision as to implement the data pipeline on the given execution platform. Furthermore, in this way, the system may pre-vet access or other operations performed on data to reduce data breaches of sensitive user data, thereby improving the security of data obtained via data pipelines. Moreover, in this way, the system reduces the amount of computer processing and memory resources conventionally utilized during a manual review of ethical data harvesting by using the predetermined, vetted, policy-controlled code portions.

Additionally, each code portion of the set of code portions can correspond (or otherwise be associated with) a respective combination of a link of a set of links and nodes connected via the link. For instance, referring back to FIG. 5, as the JSON template (or JSON object) can indicate the architecture of the data pipeline, the JSON template may not include the actual code used to generate (or implement) the data pipeline. For example, as the JSON template may include node-related, link-related, or operation-related information of the data pipeline architecture, such as node identifiers, link identifiers, user selectable commands/instructions, data types, data labels, or other information, the JSON template may represent placeholder values for source code to be implemented. That is, to reduce the amount of computer memory conventionally utilized to edit, share, and implement data pipelines, the JSON template may be used as a template for which source code may be combined with to generate the data pipeline itself. For example, since the JSON template uses a minuscule amount of computer memory, the JSON template may be shared amongst other users (e.g., over one or more computing networks) while reducing the amount of bandwidth and network traffic conventionally required to share large data pipeline-related files. As such, the JSON template may be easily sharable, however, may not include executable instructions for executing the implementation of the data pipeline itself.

Each code portion of the set of code portions, however, can correspond to a respective combination of the nodes and links of data pipeline architecture 510. For instance, the set of code portions may be predetermined code portions that include placeholder values (e.g., data types, labels, operations, user provided instructions/commands, etc.) for each node and link combination of the data pipeline architecture 510. For example, the JSON template may include an indication for first node 506a to be linked to second node 506b. For each of the nodes indicated in the JSON template, each node may be associated with a label, a data type, or one or more user provided/selected commands or instructions. For instance, in the JSON template, the first node 506a may be associated with a label of "Calendar" (e.g., identifying the data repository to which data is obtained from) and a data type of "data source" (e.g., indicating the node is associated with a data repository or data base). Second node 506b may be associated with a label of "Date" (e.g., indicating to obtain date(s) from a data source), a data type of "Select" (e.g., indicating the operation of the node is a select operation), and one or more user provided instructions/commands (e.g., criteria). For example, the one or more user provided instructions/commands may be used to instruct the node a date range of the data to obtain, or other dates, in accordance with one or more implementations of the present technology. As yet another example, the JSON template may also include an indication that first node 506a is linked to second node 506b.

Process 400 can use the JSON template to determine a code portion that corresponds to the combination of first node 506a and second node 506b being linked. For example, process 400 can select a predetermined code portion that links together a first node and a second node. Process 400 can use the data types indicated in the JSON template to identify a code portion that links together nodes of the respective data types. For instance, a predetermined code portion may link together a data type of "data source" and a data type of "select." Process 400 can parse through the set of predetermined code portions using the data types as indicated in the JSON template to determine a match between the data types of the predetermined code portions. Upon identifying a match, process 400 may select the predetermined code portion. It should be noted that other combinations of corresponding code portions linking nodes together may exist, and such example is exemplary.

To clarify, the JSON template may include information that is related to the data pipeline architecture 510, however, such information may not be executable within a computing environment. The predetermined code portions, however, include executable code that includes additional implementation details on how given nodes are linked (or otherwise connected) to other nodes, or additional input parameters from the JSON template (e.g., labels, criteria, user selectable commands, etc.). For instance, to enable users to create robust data pipelines who may be unskilled or unknowledgeable of how data pipelines are coded/implemented via source code, the predetermined code portions represent "implementable code" that may be pieced together to execute the created data pipeline architecture 510. That is, the predetermined code portions may be pieces of source code that may be put together, using labels included in the JSON template, to indicate which data sources data is being retrieved from, what user provided commands are associated with given nodes, what operations to perform on the data being obtained from a given source/node, and how the nodes are linked together. Furthermore, as each code portion may be predetermined, such code portions are tested and validated for functionality ensuring that when a data pipeline is created using the predetermined code portions, the data pipeline will be executed without error. In this way, the system optimizes data pipeline generation by using predetermined and pre-vetted (e.g., for errors) code portions as opposed to existing systems testing data pipeline implementations, thereby reducing the amount of computer processing and computer memory resources required to implement a data pipeline.

At act 410, process 400 can generate executable instructions associated with the data pipeline. For example, process 400 can generate executable instructions associated with the data pipeline architecture by using a transformation component configured to process the set of code portions with respect to the remote execution platform using the JSON object (e.g., template). As discussed above, process 400 may use the set of code portions to generate executable instructions for implementing the data pipeline. The executable instructions may be customized for the remote execution platform. For example, as the remote execution platform may be associated with its own requirements, the executable instructions may be customized to run (e.g., execute, host, or otherwise implement) the data pipeline.

In some implementations, process 400 can use a transformation component to generate the executable instructions associated with the data pipeline architecture. The transformation component may transform the JSON object and the associated code portions (e.g., the code portions corresponding to the JSON template) into executable instructions to execute on the remote execution platform. The transformation component may be part of a computing device (e.g., client computing device 302 (FIG. 3)) and may be hosted or installed on the computing device via a web-browsing application or other software application (e.g., application 212a of device 200 (FIG. 2)). In other implementations, the transformation component may be hosted on the web server providing the GUI, in accordance with some implementations of the present technology. For example, the transformation component may be a low code transformation component (e.g., as implemented as part of a software application) or may be a low code transformation layer (e.g., as implemented via a website or web server associated with the system). The benefit of using a low code transformation component is realized by the mechanism it operates. For example, the low code transformation component (e.g., transformation component), as discussed above, uses "low code" solutions to implement robust computing programs, such as data pipelines. Using low code platforms enables users that do not possess the specialized knowledge to implement robust software applications that were otherwise unattainable. By using the predetermined code portions, the low code transformation layer can generate and implement data pipelines (and other software applications) quickly and efficiently as opposed to existing systems.

The transformation component may be configured to receive, as input, the JSON template, the predetermined code portions, or the platform identifier and output executable instructions customized for the execution platform (e.g., the remote execution platform). Additionally, the transformation component may process the inputs (e.g., of one computing language, of multiple computing languages, such as JavaScript, Python, C, C++, Java, Ruby, etc.) and generate the executable instructions via runtime technologies such as Spark, Pyspark, Beam, Storm, or other runtime technologies. In this way, the system may generate platform-agnostic data pipelines as the executable instructions for implementing the data pipelines are generated at runtime using predetermined code portions, the JSON template, and the platform identifier, thereby reducing the amount of computer processing and memory resources conventionally required to implement a data pipeline. Moreover, by generating such executable instructions during a runtime routine for any given platform, the system ensures widespread scalability and shareability of such pipelines as edits, updates, or changes to such data pipelines may be pushed and generated at runtime, thereby further reducing the amount of network traffic and computer processing and memory resources.

The transformation component can use the JSON template to piece together the predetermined code portions and generate the executable instructions in a computing language readable by the remote execution platform. For example, as discussed above, the JSON template may include information that is associated with the user selections indicating the data pipeline architecture (e.g., nodes, links, labels, user provided instructions/commands, data types, etc.). The transformation component may use such information and the predetermined code portions corresponding to the user selections to generate the executable instructions during a runtime routine. The advantage of the transformation component as opposed to existing systems is that the transformation component uses a generic computing language (e.g., which the JSON template and the predetermined code portions are written in) and transforms the generic computing language into a computing language understood by the platform to which the data pipeline is to be implemented (e.g., hosted) on. That is, as opposed to requiring a specialized compiler to compile source code to be executable on a given platform, the transformation component uses the generic language of the JSON template and the predetermined code portions to generate executable instructions at runtime, in a language understood by the remote execution platform. In this way, the system enables data pipelines to be implemented on any platform, regardless of the technical requirements of the execution platform.

In some implementations, a transformation component may be selected from a set of transformation components. For example, in some implementations, transformation components may be specific to one or more computing languages. As such process 400 may determine a first computing language associated with the remote execution platform. For instance, process 400 may query a database including platform identifiers (e.g., a value, alphanumeric value, name, or other identifier) and associated computing languages. Each platform identifier may correspond to a given computing language (e.g., JavaScript, Python, C, C++, Ruby, Java, etc.). Process 400 may determine a match between the platform identifier of the remote execution platform (e.g., to host the data pipeline) and a platform identifier of the database to identify the computing language associated with the remote execution platform. Process 400 may then determine a second computing language associated with the set of code portions. For example, the set of predetermined code portions may be written in another computing language which may differ from that of the remote execution platform. Therefore, to generate the executable instructions associated with the data pipeline architecture, process 400 may select a transformation component from a set of transformation components that is associated with (i) the first computing language and (ii) the second computing language. The set of transformation components may be stored in a database (e.g., database 308), and process 400 may query the database using the first computing language and the second computing language to select a transformation component to be used for generating the executable instructions. In some implementations, the selected transformation component may be configured to transform each code portion of the set of code portions associated with the second computing language into the first computing language (e.g., of the remote execution platform). Process 400 may then generate, using the selected transformation component, the executable instructions associated with the data pipeline by providing the selected transformation component with the set of code portions and the JSON template. In this way, the system may generate platform-agnostic data pipelines by transforming code of one computing language into another.

At act 412, process 400 can provide executable instructions to the remote execution platform. For example, process 400 can provide the executable instructions to the remote execution platform to host the data pipeline. To enable the data pipeline to be hosted on (e.g., executed on, ran on, process data on, etc.), process 400 may automatically transmit (e.g., via the Internet, one or more computing networks, etc.) the executable instructions to the remote execution platform. Additionally, process 400 can automatically execute (e.g., run the executable instructions) on the remote execution platform. In this way, the platform-agnostic data pipeline is automatically implemented on the remote execution platform, thereby reducing data pipeline implementation time delays and enabling users to obtain and analyze data faster than that of conventional systems.

In some implementations, process 400 can provide visual indications related to the data pipeline via a GUI. For example, referring back to FIG. 5, process 400 can provide visual indications of how many times a node is being used with respect to other nodes of other data pipelines. For instance, to provide users (e.g., data analysts, business professionals, etc.) with information regarding lineage tracking of data sources, databases, and data repositories being utilized, process 400 may generate visual indications of an amount of use regarding a given node. For instance, visual indicator 514 may indicate that the Calendar data source has been used twice with respect to other pre-generated data pipelines. That is, such visual indications may provide useful information to users building a data pipeline as to which data repositories are being utilized the most, and which data repositories should be focused on when analyzing data. Not only can such visual indications may provide useful information directed to which data repositories are utilized, but also how certain nodes, filters, or operations are being used in conjunction with the data pipelines and which nodes are in common with other data pipelines implemented via the system.

To accomplish this, process 400 may determine, from a set of pre-generated data pipelines, a set of common nodes.

The set of common nodes may indicate nodes that are common to (i) nodes of the set of pre-generated data pipelines and (ii) the data pipeline (e.g., being created/implemented by the user). For example, the system may store JSON objects (e.g., templates) of the pre-generated data pipelines in a database associated with the system (e.g., database 308 (FIG. 3)). In this way, as opposed to storing the fully implemented source code of the pre-generated data pipelines, the system reduces the amount of computer memory required to store the pre-generated data pipelines. Process 400 may determine the set of common nodes by comparing each node of the data pipeline (e.g., the nodes of data pipeline architecture 510) to each node of the pre-generated data pipelines. Upon determining the set of common nodes, process 400 may determine an amount of common nodes respective to a given common node. For example, for a given node (e.g., first node 506a), process 400 may extract the label associated with the node (e.g., Calendar) and determine how many times the calendar node is used with respect to the pre-generated data pipelines. Process 400 may then generate for display, at the GUI (e.g., GUI 500), a visual indication indicating the amount of common nodes for the given common node. For example, the visual indication may be a numerical value, a color-coded shape, a geometrical object, or other visual indicator indicating the amount of times a given node is used with respect to the pre-generated data pipelines. In this way, the system provides users with lineage tracking information with respect to the usage of data repositories of data pipelines, thereby improving the user experience.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples: alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112 (f) will begin with the words "means for," but use of the term "for" in any other context is not intended to invoke treatment under 35 U.S.C. § 112 (f). Accordingly, the applicant reserves the right to pursue additional claims after filing this application to pursue such additional claim forms, in either this application or in a continuing application.

We claim:

1. A system for generating a platform-agnostic data pipeline via a low code transformation layer, the system comprising:
   at least one processor; and
   at least one memory coupled to the at least one processor and storing instructions that,
   when executed by the at least one processor, perform operations comprising:
      receiving, via a computer application, indications of (i) one or more nodes and (ii) a set of links linking at least some the nodes;
      generating, based on the received indications, a data object associated with the indications corresponding to a data pipeline architecture;
      determining, based on the generated data object and a platform identifier associated with an execution platform, a set of code portions, wherein each code portion of the set of code portions corresponds to a respective combination of at least: (i) a link among the set of links, and (ii) the nodes connected via the link;

generating first instructions associated with the data pipeline architecture based on: (i) the data object, (ii) the set of code portions, and (iii) the platform identifier; and providing the generated first instructions to the execution platform to host a data pipeline associated with the data pipeline architecture.

2. The system of claim 1, wherein the received indications are generated for display in a user interface in a visual layout, wherein the visual layout visually depicts the data pipeline architecture of the data pipeline.

3. The system of claim 1, wherein the instructions when executed by the at least one processor further perform operations comprising:

determining, from a set of pre-generated data pipelines, a set of common nodes, wherein the set of common nodes indicate nodes that are common to (i) nodes of the set of pre-generated data pipelines and (ii) the data pipeline;

determining, for each common node of the set of common nodes, an amount of common nodes respective to a given common node; and generating for display, at a user interface, a visual indication of the amount of common nodes respective to the given common node.

4. The system of claim 1, wherein at least one node of the one or more nodes includes an instruction to generate a data structure associated with one or more of the nodes.

5. The system of claim 1, wherein the computer application is a web-browsing application.

6. The system of claim 1, wherein each code portion of the set of code portions are associated with a security assessment value, wherein the security assessment value indicates a level of computing security associated with the execution platform.

7. A method for generating a platform-agnostic data pipeline, the method comprising:

receiving, via a indications comprising one or more nodes and links;

generating, using the received indications, a data object associated with the indications corresponding to a data pipeline architecture;

determining, using the generated data object, a set of code portions reflecting the indications of the one or more nodes and the links; and generating instructions associated with the data pipeline architecture for an execution platform using the set of code portions.

8. The method of claim 7, wherein the received indications are generated for display in a user interface in a visual layout, wherein the visual layout visually depicts the data pipeline architecture.

9. The method of claim 7, further comprising:

determining, from a set of pre-generated data pipelines, a set of common nodes, wherein the set of common nodes indicate nodes that are common to (i) nodes of the set of pre-generated data pipelines and (ii) the data pipeline architecture;

determining, for each common node of the set of common nodes, an amount of common nodes respective to a given common node; and generating for display, at a user interface, a visual indication of the amount of common nodes respective to the given common node.

10. The method of claim 7, wherein at least one node of the indications includes an instruction to generate a data structure associated with one or more of the nodes.

11. The method of claim 7, wherein a transformation component (i) generates the instructions associated with the data pipeline architecture and (ii) is part of an application associated with a user interface.

12. The method of claim 7, wherein each code portion of the set of code portions are associated with a security assessment value, wherein the security assessment value indicates a level of computing security associated with the execution platform.

13. The method of claim 7, wherein generating the instructions associated with the data pipeline architecture further comprises:

determining a first computing language associated with the execution platform using a platform identifier associated with the execution platform;

determining a second computing language associated with the set of code portions;

selecting a first transformation component associated with (i) the first computing language and (ii) the second computing language from a set of transformation components, wherein the first transformation component is configured to transform each code portion of the set of code portions associated with the second computing language into the first computing language; and generating, by the first transformation component, the instructions associated with the data pipeline architecture using (i) the set of code portions and (ii) the data object.

14. One or more non-transitory computer-readable media comprising instructions that, when executed by one or more processors, cause operations comprising:

receiving indications comprising one or more nodes and links indicating;

generating, using the received indications, a data object associated with the indications corresponding to a data pipeline architecture;

determining, using the data object, a set of code portions reflecting the indications of the one or more nodes and the links; and generating first instructions associated with the data pipeline architecture for an execution platform using the set of code portions.

15. The media of claim 14, wherein the received indications are generated for display in a user interface in a visual layout, wherein the visual layout visually depicts the data pipeline architecture.

16. The media of claim 14, wherein the operations further comprise:

determining, from a set of pre-generated data pipelines, a set of common nodes, wherein the set of common nodes indicate nodes that are common to (i) nodes of the set of pre-generated data pipelines and (ii) the data pipeline architecture;

determining, for each common node of the set of common nodes, an amount of common nodes respective to a given common node; and generating for display, at a user interface, a visual indication of the amount of common nodes respective to the given common node.

17. The media of claim 14, wherein at least one node of the indications includes an instruction to generate a data structure associated with one or more of the nodes.

18. The media of claim 14, wherein a transformation component (i) generates the instructions associated with the data pipeline architecture and (ii) is part of an application associated with a user interface.

19. The media of claim 14, wherein each code portion of the set of code portions are associated with a security assessment value, wherein the security assessment value indicates a level of computing security associated with the execution platform.

20. The media of claim 14, wherein generating the instructions associated with the data pipeline architecture further comprises:
   determining a first computing language associated with the execution platform using a platform identifier associated with the execution platform;
   determining a second computing language associated with the set of code portions;
   selecting a first transformation component associated with (i) the first computing language and (ii) the second computing language from a set of transformation components, wherein the first transformation component is configured to transform each code portion of the set of code portions associated with the second computing language into the first computing language; and
   generating, by the first transformation component, the instructions associated with the data pipeline architecture using (i) the set of code portions and (ii) the data object.

* * * * *